United States Patent [19]

Miyauchi et al.

[11] 3,958,658

[45] May 25, 1976

[54] LOCKING DEVICE FOR SHIFT MECHANISM OF AN AUTOMOTIVE POWER TRANSMISSION SYSTEM

[75] Inventors: Toshiyuki Miyauchi, Yokohama; Wataru Ishimaru, Fujisawa; Shigeru Miida, Yokosuka, all of Japan

[73] Assignee: Nissan Motor Co., Ltd., Yokohama, Japan

[22] Filed: Sept. 12, 1974

[21] Appl. No.: 505,460

[30] Foreign Application Priority Data
Sept. 20, 1973  Japan.............................. 48-105473

[52] U.S. Cl............................. 180/82 C; 180/82 A
[51] Int. Cl.².......................................... B60R 21/10
[58] Field of Search................ 180/82 C; 340/52 E; 307/105 B; 74/475; 251/57; 70/248

[56] References Cited
UNITED STATES PATENTS

| | | | |
|---|---|---|---|
| 2,740,947 | 10/1953 | Davies.............................. | 180/82 A |
| 2,924,124 | 2/1960 | Froslie.............................. | 74/475 X |
| 3,226,674 | 12/1965 | Eriksson............................ | 180/82 C |
| 3,610,004 | 10/1971 | Neese................................ | 70/248 |
| 3,729,059 | 5/1973 | Redmond.......................... | 180/82 C |
| 3,859,625 | 1/1975 | Eggert............................... | 180/82 C |

*Primary Examiner*—Kenneth H. Betts

[57] ABSTRACT

The shift mechanism of an automotive power transmission system is locked in the neutral or parking position by a locking device which is responsive to completion or incompletion of a prescribed manipulative procedure to render a safety device such as a safety belt arrangement into a proper protective position, the locking device including a cam movable with any suitable member of the shift mechanism and a catch member which is moved into locking engagement with the cam if the prescribed manipulative steps to move the safety device into the proper protective position is incomplete.

15 Claims, 3 Drawing Figures

LOCKING DEVICE FOR SHIFT MECHANISM OF AN AUTOMOTIVE POWER TRANSMISSION SYSTEM

The present invention relates generally to power transmission systems of automotive vehicles and, more particularly, to a locking device for use with a manually operated shift mechanism of an automotive power transmission mechanism.

To protect a vehicle occupant in the event of a collision encountered by the vehicle, the vehicle is equipped with a safety belt arrangement which is adapted to restrain the vehicle occupant when the occupant is violently forced forward. Because of the unwieldy procedures which are necessitated for mounting the seat belt on the vehicle occupant, however, there is a tendency that the seat belt arrangement is left unused during cruising of the vehicle. A device has therefore been proposed which is operative to produce a warning signal and simultaneously makes the engine inoperative to start until the seat belt is mounted on the vehicle occupant in a predetermined mode of manipulative procedure. A drawback is thus encountered in the safety arrangement of this nature because of the fact that the predetermined manipulative procedure must be at all times followed when the engine is to be started from a rest condition even though the starting of the engine is required for the purpose of inspection and servicing. The present invention contemplates elimination of such a drawback inherent in the safety belt arrangement of the described nature.

The engine of an automotive vehicle can be started from a rest condition only when the shift lever of the power transmission system is in either the neutral position or the parking position. In an automatic power transmission system of an automotive vehicle, moreover, the motions of the shift lever checked by means of a detent plunger which is forced against a cam member movable with the shift lever and formed with a series of recessed which correspond to the various operational positions of the shift lever. The present invention proposes to make use of such an arrangement of the power transmission system for locking the shift mechanism of the transmission system in the neutral or parking position if and whenever the prescribed manipulative procedure to mount the safety belt on the vehicle occupant is incomplete.

In accordance with the present invention, there is provided a locking device which comprises a cam movable with the manually operated shift mechanism of a power transmission system and formed with recesses which correspond respectively to the neutral and parking positions of the shift mechanism, a catch member in sliding engagement with the cam, resilient biasing means for urging the catch member against the cam, driving means having an operative condition to drive the catch member into locking engagement with the cam through one of the recesses in the cam for thereby locking the shift mechanism of the transmission system in the neutral or parking position, and actuating means responsive to completion of prescribed manipulative procedure of a vehicle occupant for actuating the driving means into the operative condition when the shift mechanism is in either the neutral position or the parking position. The driving means may comprise, in a preferred embodiment of the present invention, a plunger axially movable in an elongate chamber and engaging the catch member through the resilient biasing means, and a hydraulic fluid line leading from a source of fluid under pressure to the elongate chamber for directing the fluid under pressure into the chamber and thereby causing the fluid to act on the plunger so that the plunger is axially moved toward the catch member for driving the catch member into one of the recessed in the cam, the fluid line having a drain port which is located between the source of the fluid and the elongate chamber and which is opened by the actuating means responsive to the completion of the prescribed manipulative procedure of the vehicle occupant when the shift mechanism of the transmission system is in the neutral or parking position. In the embodiment thus arranged, the actuating means may comprise solenoid-operated valve means having a first condition to close the drain port of the fluid line and a second condition to open the drain port, and an electrical switching circuit connected between a power source and the solenoid-operated valve means and responsive to the completion of the prescribed manipulative procedure of the vehicle occupant under the neutral or parking condition of the transmission system for maintaining the valve means in the first condition thereof if the prescribed manipulative procedure of the vehicle occupant is incomplete or actuating the valve means from the first condition into the second condition thereof when the prescribed manipulative procedure of the vehicle occupant is complete under the neutral or parking condition of the transmission system. In another preferred embodiment of the present invention, the driving means may comprise a solenoid-operated plunger having a first position retracted from the catch member and a second position in pressing engagement with the catch member to drive the catch member into locking engagement with the cam through one of the recesses in the cam, the solenoid-operated plunger being moved by the actuating means to the first position responsive to the completion of the prescribed manipulative procedure of the vehicle occupant or to the second position responsive to incompletion of the procedure during neutral or parking condition of the transmission system. In this instance, the actuating means may comprise an electrical switching circuit connected between a power source and the solenoid-operated plunger and responsive to the completion of the prescribed manipulative procedure of the vehicle occupant under the neutral or parking condition of the transmission system for maintaining the solenoid-operated plunger in the first position thereof if the prescribed manipulative procedure is complete or actuating the solenoid-operated plunger from the first position into the second position thereof if the prescribed manipulative procedure of the vehicle occupant is incomplete during the neutral or parking condition of the power transmission system.

The features and advantages of the locking device according to the present invention will become more apparent from the following description taken in conjunction with the following drawings in which like reference numerals designated corresponding parts and elements throughout the figures and in which.

Figure 1:
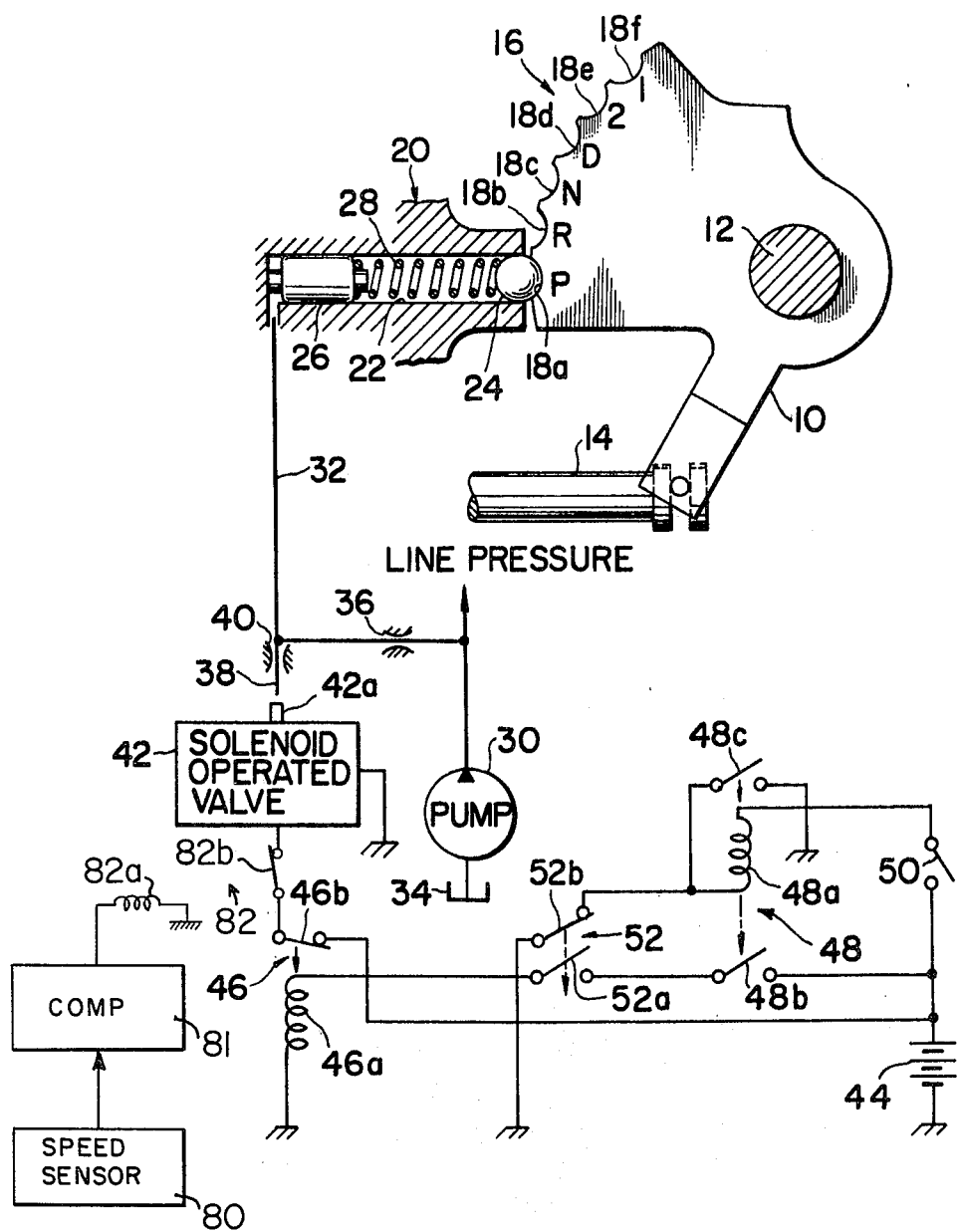
FIG. 1 is a schematic view which shows a first preferred embodiment of the locking device according to the present invention.

Reference will now be made to the drawings, first to FIG. 1. The locking device embodying the present invention is herein shown as being incorporated into an automatic power transmission system which has a shift mechanism including a manually operated shift lever 10 rotatable about a shaft 12, and a manual selector valve 14 engaged by the shift lever 10. The manual selector valve 14 is adapted to be driven by the shift lever 10 and moved to various positions including the neutral and parking positions depending upon the angular position of the shift lever 10.

The shift lever 10 is formed with a cam portion 16 which has a series of recesses corresponding to the operational positions of the shift lever 10. The recesses thus formed in the cam portion 16 are shown to consist of first to sixth recesses 18a to 18f which are assumed, by way of example, to correspond to the parking position P, the reverse-drive position R, the neutral position N, the automatic forward-drive position D, the manual second-speed forward-drive position 2 and the manual first-speed forward drive position 1 of the shift lever 10, as illustrated.

Designated by reference numeral 20 is a portion of a transmission casing in which are accommodated brakes, clutches and gear units of the power transmission system and which is formed with a hydraulic fluid circuit to control the brakes and clutches depending upon the selected positions of the manual selector valve 14 as is well known in the art. In the embodiment of the present invention, the transmission casing 20 is formed with an elongate chamber 22 having an open axial and which is located in proximity to the cam portion 16 of the shift lever 10. A spherical catch member 24 is located at this open end of the elongate chamber 22 and is thus engageable with the cam portion 16 of the shift lever 10. A plunger 26 is axially slidable in the chamber 22 toward and away from the open end of the chamber. Between the catch member 24 and the plunger 26 is positioned a preload spring 28 which is seated at one end on an inner end of the spherical catch member 24 and the foremost end of the plunger 26, urging the catch member 24 away from the plunger 26 and accordingly against the cam portion 16.

The chamber 22 communicates at its axial end opposite to the open end adjacent the cam portion 16 with a source 30 of fluid under pressure through a fluid line 32. The source 30 of the fluid under pressure may be an oil pump which is usually used in the hydraulic control circuit of an automatic power transmission system to develope a line pressure to actuate the servos of the brakes and clutches of the transmission system. Designated by reference numeral 34 is an oil reservoir which is connected to the suction port of the oil pump 30. The fluid line 32 is provided with a restriction or orifice 36 to meter the fluid to be directed to the chamber 22. The fluid pressure developed in the fluid line acts upon the rearmost end face of the plunger 26 in the chamber 22 to cause the plunger 26 to axially move toward the spherical catch member 24 as will be discussed later.

The fluid line 32 communicates at a point intervening between the restriction 36 and an inlet port of the chamber 22 with a drain port 38 through a restriction or orifice 40 which has a cross sectional area larger than that of the previously mentioned restriction or orifice 36. The drain port 38 is closed or open by means of a solenoid-operated valve 42 which has a valve element in the form of a plunger 42a which is axially movable into or out of the drain port 38 when the valve 42 is energized or deenergized. By way of example, the solenoid-operated valve 42 in the embodiment herein shown is assumed to be arranged in such a manner that the plunger 42a thereof is biased by, for example, a preload spring (not shown) to retract from the drain port 38 and is driven to project into the drain port 38 when the valve 42 is electrically energized.

The solenoid-operated valve 42 has a solenoid coil (not shown) which is connected to a power source 44 over a switching circuit which is composed of first and second relays 46 and 48 and first and second switches 50 and 52. The first relay 46 consists of a relay coil 46a and a normally closed movable contact 46b which is to be open when the relay coil 46a is energized. The movable contact 46b of the first relay 46 is connected between the solenoid coil of the solenoid-operated valve 42 and the power source 44 so that the solenoid-operated valve 42 is energized when the relay 46 is closed as illustrated. The second relay 48 consists of a relay coil 48a and first and second normally open movable contacts 48b and 48c which are to be closed when the relay coil 48a is energized. The first switch 50 is biased to open and is closed responsive to seated condition of the vehicle occupant who usually is a driver of the vehicle in the present context. The second switch 52 has a normally open movable contact 52a and a normally closed movable contact 52b. The normally closed movable contact 52b of the second switch 52 is adapted to open responsive to a condition in which the safety belt arranged in the vehicle is completely mounted on the vehicle occupant by a prescribed manipulative procedure taken by the occupant or the driver of the vehicle. The two movable contacts 52a and 52b of the second switch 52 are mechanically interconnected together so that the normally open movable contact 52a is closed when the normally closed movable contact 52b is open responsive to the completion of the prescribed manipulative procedure to mount the safety belt on the vehicle occupant. The relay coil 46a of the first relay 46 is grounded at one end and connected at the other to the positive terminal of the power source 44 over a series combination of the first normally open movable contact 48b of the second relay 48 and the normally open movable contact 52a of the second switch 52. The relay coil 46a of the first relay 46 is energized and accordingly the normally closed movable contact 46b of the relay 46 is open when both of the first normally open movable contact 48b of the second relay 48 and the normally-open movable contact 52a of the second switch 52 are closed concurrently. The relay coil 48a of the second relay 48 has an input terminal connected across the first switch 50 to the positive terminal of the power source 44 and an output terminal connected to ground across the normally closed movable contact 52b of the second switch 52. The output terminal of the relay coil 48a of the second relay 48 is further connected to ground across the second normally open movable contact 48c of the second relay 48.

When, in operation, the vehicle occupant or the driver enters the vehicle cabin and is seated on the seat which usually is the driver's seat, then the first switch 50 closes. Since, at this instant, the seat belt is in a condition not mounted on the occupant of the seat, the normally closed movable contact 52b of the second switch 52 remains closed so that the relay coil 48a is energized from the power source 44 when the first switch 50 is closed. The relay coil 48a of the second relay 48 being thus energized from the power source 44, the normally open movable contacts 48b and 48c of the relay 48 are closed concurrently. If the vehicle driver then starts the engine with the safety belt left unused or in a condition incompletely mounted on the driver, the normally closed movable 52b of the second switch 52 is maintained in a closed condition so that the normally open movable contact 52a coacting with the former is kept open. The relay coil 46a of the first relay 46 consequently remains de-energized and accordingly the normally closed movable contact 46b of the relay 46 is kept closed. Under these conditions, the solenoid-operated valve 42 is energized from the power source 44 through the first relay 46 so that the plunger 42a of the valve projects into the drain port 38 of the fluid line 32 and thus closes the drain port 38. The line pressure is consequently directed from the pump 30 into the chamber 22 in the transmission casing 20 and acts upon the rearmost end face of the plunger 26, causing the plunger 26 to axially move toward the spherical catch member 24. The catch member 24 is therefore forcefully received in either the first or third recess 18a or 18c in the cam portion 16 of the shift lever which is in either the parking position P or the neutral position N. The shift lever 10 is consequently locked in the parking or neutral position so that the manual selector valve 14 can not be shifted to any of the forward or reverse drive positions.

When, however, the occupant of the seat properly proceeds with the prescribed steps to be fitted with the safety belt, then the normally closed movable contact 52b of the second switch 52 will open to cause the normally open movable contact 52a to close. A closed circuit is now completed by the relay coil 46a of the first relay 46, the first movable contact 48b of the second relay 48, the movable contact 52a of the second switch 52 and the power source 44. The relay coil 46a of the first relay 46 is thus energized from the power source 44 and, as a consequence, the normally closed movable contact 46b of the first relay 46 is caused to open. The solenoid-operated valve 42 is now deenergized so that the plunger 42a of the valve 42 retracts from the drain port 38 of the fluid line 32. The line pressure which has been developed in the fluid line 32 is discharged from the drain port 38 with the result that the plunger 26 in the chamber 22 is axially moved away from the spherical catch member 24 by the force of the preload spring 22. The catch member 24 is thus relieved of the force from the plunger 26 and permits the cam portion 16 and accordingly the shift lever 10 to freely rotate about the shaft 12. The manual selector valve 14 is now allowed to any of the operative positions thereof. When the normally closed movable contact 52b of the second switch 52 is open responsive to the completion of the prescribed manipulative procedure taken by the seat occupant, the relay coil 48a of the second relay 48 is grounded through the second normally open movable contact 48c which has been closed responsive to closing of the first switch 50. The first normally open movable contact 48b of the second relay 48 is, in this manner, maintained closed when the normally closed movable contact 52b of the switch 52 is made open. The second switch 52 is arranged so that the normally closed movable contact 52b thereof is kept open once it has been made open in response to the completion of the prescribed manipulative procedure to mount the safety belt on the vehicle occupant unless the vehicle is for a second time brought into a full stop with the shift lever 10 moved to the parking or neutral position.

Figure 2:
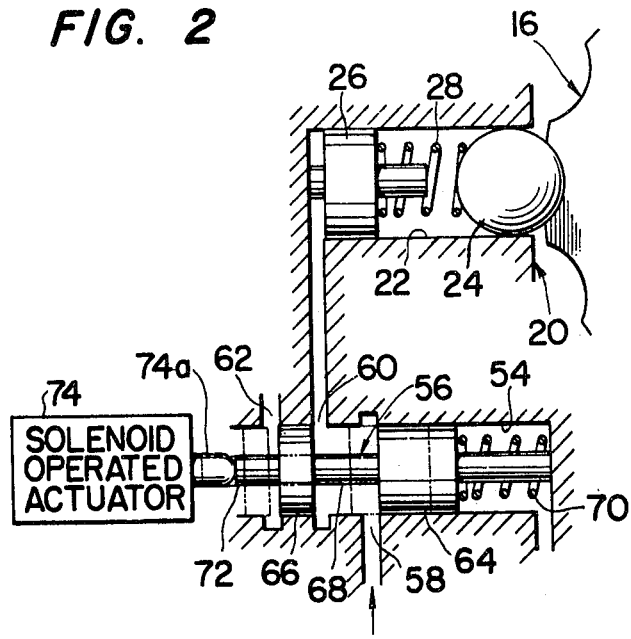
FIG. 2 is a sectional view showing a mechanical arrangement of a second preferred embodiment of the locking device according to the present invention.

The solenoid-operated valve 42 in the embodiment of the present invention thus far described is arranged to close or open the drain port 38 of the fluid line 32 directly by the plunger 42a thereof. Where desired, however, the valve may be modified so that a valve element constructed separately of the plunger is driven by the plunger. FIG. 2 illustrates an embodiment of the locking device incorporating the valve means of this nature.

Referring to Fig. 2a, the solenoid-operated valve means comprises an elongate valve chamber 54 formed in the transmission casing 20 and a spool valve member 56 which is axially movable in the elongate chamber 54. The elongate chamber 54 has a fluid inlet port 58 in communication with the oil pump 30 (FIG. 1), a fluid outlet port 60 in communication with the fluid inlet port of the previously mentioned chamber 22, and a drain port 62 which may be led to the oil reservoir 34 (FIG. 1). The spool valve member 56 is formed with axially spaced first and second lands 64 and 66 and a circumferential groove 68 located between the lands 64 and 66 as illustrated. The spool valve member 56 is axially movable between a first position providing communication between the fluid inlet and outlet ports 58 and 60 through the circumferential groove 68 and isolating the drain port 62 from the fluid inlet and outlet ports 58 and 60 by the second land 66 as indicated by full lines and a second position closing the fluid inlet port 58 by the first land 64 and providing communication between the fluid outlet port 60 and the drain port 62 through the circumferential groove 68 as indicated by phantom lines. The spool valve member 56 is biased to move from the first position to the second position by means of a preload spring 70 positioned in an axial end portion of the valve housing 54 and seated at one end on an outer end face of the first land 64. The spool valve member 56 has an axial extension 72 projecting axially outwardly from an outer end face of the second land 66.

A solenoid-operated actuator 74 has a plunger 74a which is directed in line with the axial extension 72 of the spool valve member 56. The solenoid-operated actuator 74 is so arranged that the plunger 74a is axially moved forward into pressing engagement with the extension 72 of the spool valve member 56 when the actuator 74 is electrically energized and is retracted and disengaged from the extension 72 when the actuator 74 is de-energized. The solenoid-operated actuator 74 is connected to a power source over a switching circuit (not shown) which is arranged similarly to that which is incorporated into the previously described embodiment shown in FIG. 1. The solenoid-operated actuator 74 is, therefore, kept energized unless a vehicle occupant is seated on, for example, the driver's seat of the vehicle and furthermore all the prescribed manipulative steps have been complete to have the safety belt properly mounted on the occupant of the seat. When the solenoid-operated actuator 74 is thus kept energized, the plunger 74a of the actuator 74 is held in pressing engagement with the extension 72 of the spool valve member 56, which is consequently maintained in the previously mentioned first position providing communication between the fluid inlet and outlet ports 58 and 60 through the circumferential groove 68 in the valve member 56. The fluid pressure from the fluid source is therefore pumped to the chamber 22 and acts on the axial end face of the plunger 26. The plunger 26 is axially moved toward the spherical catch member 24, which is consequently forced into locking engagement with the cam portion 16 of the shift lever (not shown). The shift mechanism of the power transmission is, thus, locked in the parking or neutral position as previously discussed in connection with the embodiment illustrated in FIG. 1.

When, however, the prescribed procedure is complete so that the occupant of the seat is properly fitted with the safety belt, the solenoid-operated actuator 74 is de-energized so that the plunger 74a thereof retracts from the position engaging the extension 72 of the spool valve member 56. The spool valve member 56 is consequently moved by the action of the preload spring 70 from the first position to the second position indicated by the phantom lines in FIG. 2, closing the fluid inlet port 58 and providing communication between the fluid inlet port 60 and the drain port 62. The fluid pressure which has been acting on the plunger 26 in the chamber 22 is discharged from the drain port 62 so that the plunger 26 is axially moved away from the catch member 24 by the force of the preload spring 28. The spherical catch member 24 is now in sliding engagement with the cam portion 16 of the shift lever which is thus allowed to freely rotate from the parking or neutral position.

Figure 3:
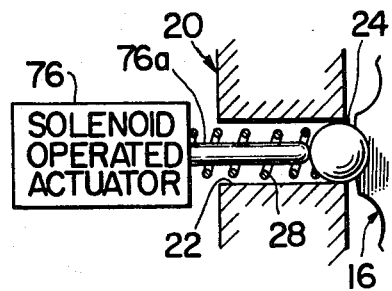
FIG. 3 is a sectional view showing a mechanical arrangement of a third preferred embodiment of the locking device according to the present invention.

While the first and second embodiments of the locking device thus far described with reference to FIGS. 1 and 2 are so arranged that the catch member 24 is driven into the locking position by means of the plunger 26 which is acted upon by hydraulic fluid, the catch member may be moved into the locking position directly by a solenoid-operated actuator. FIG. 3 illustrates an embodiment of this nature.

Referring to FIG. 3, the chamber 22 receiving the spherical catch member 24 has open axial ends and a solenoid-operated actuator, now designated by reference numeral 76, is positioned in proximity to the end of the chamber 22 opposite to the end in which the catch member 24 is located. The solenoid-operated actuator 76 has a plunger 76a axially projecting into the chamber 22 and is engageable at its leading end with the catch member 24. The solenoid-operated actuator 76 is so arranged that the plunger 76a is moved forward into pressing engagement with the catch member 24 when the actuator 76 is energized and is retracted from the catch member 24 when the actuator 76 is de-energized. The solenoid-operated actuator 76 is energized and de-energized by means of a switching circuit which is constructed similarly to that illustrated in FIG. 1 so that the catch member 24 is brought into locking engagement with the cam portion 16 when the safety belt is left unused.

While a few preferred embodiments of the locking device according to the present invention have thus far been described, it should be borne in mind that such embodiments are merely illustrative of the gist of the present invention and are, therefore, subject to various changes and modifications. Where desired, for example, the switching circuit forming part of the locking device embodying the present invention may be provided with means operative to disconnect the solenoid operated valve or actuator from the power source once the vehicle has been started. There is, in this case, provided an interlock disabling relay, generally indicated at 82, with coil 82a which is energized by an actuation signal from the comparator 81. The comparator 81 produces the actuation signal when it receives a voltage signal higher than a predetermined level from a speed sensor 80. A normally closed relay switch 82b is connected in series with the relay switch 46b to the solenoid operated valve 42. The relay switch 82b is associated with the relay coil 82a and actuated when the relay coil 82a is energized by the actuation signal. This will be advantageous for preventing the shift mechanism of the power transmission system from being erroneously or accidentally locked during cruising of the vehicle. Although, moreover, the cam to be locked by the catch member has been described as being integral with the shift lever of the transmission system, the cam may be formed on or connected to any other member of the shift mechanism of the transmission system such as, for example, the manual selector valve or a member linking the shift lever with the manual selector valve. The locking device embodying the present invention has been assumed to be incorporated into the automatic power transmission system, but it is apparent that such is merely by way of example and that the locking device according to the present invention may be arranged in a manually-operated power transmission system.

What is claimed is:

1. A locking device for locking a shift mechanism of a power transmission system of an automotive vehicle responsive to predetermined manipulative procedure of a vehicle occupant, comprising a cam movable with the shift mechanism and formed with recesses including those corresponding respectively to the neutral and parking positions of the shift mechanism, a catch member in sliding engagement with said cam, resilient biasing means for urging the catch member against the cam, driving means having an operative condition to drive said catch member into locking engagement with said cam through one of the recesses corresponding to the neutral or parking position of the shift mechanism for thereby locking the shift mechanism in the neutral or parking position, said driving means comprising a plunger axially movable in an elongate chamber, and a hydraulic fluid line leading from a source of fluid under pressure to said elongate chamber for directing the fluid under pressure into the elongate chamber and thereby causing the fluid to act on said plunger so that the plunger is axially moved toward said catch member for driving the catch member into one of the recesses corresponding to the neutral and parking positions of the shift mechanism, said fluid line having a drain port which is made open by said driving means responsive to the completion of said prescribed manipulative procedure of the vehicle occupant when the shift mechanism is in either the neutral position or the parking position, and actuating means responsive to completion of said prescribed manipulative procedure of the vehicle occupant for actuating said driving means into said operative condition when the shift mechanism is in either the neutral position or the parking position.

2. A locking device as claimed in claim 1, in which said actuating means comprise solenoid-operated valve means having a first condition to close said drain port and a second condition to open the drain port, and an electrical switching circuit connected between said solenoid-operated valve means and a power source and responsive to the completion of said prescribed manipulative procedure of the vehicle occupant under the neutral or parking condition of the transmission system for maintaining said valve means in said first condition thereof if the prescribed manipulative procedure is incomplete or actuating said valve means from said first condition into said second condition thereof when the prescribed manipulative procedure of the vehicle occupant is complete under the neutral or parking condition of the transmission system.

3. A locking device as claimed in claim 2, in which said solenoid-operated valve means comprise a plunger which is movable into and away from said drain port, said plunger of the valve means being moved into the drain port to close the drain port when said switching circuit is responsive to a condition in which said prescribed manipulative procedure of the vehicle occupant is incomplete or moved out of the drain port to open the drain port when the switching circuit is responsive to the completion of the prescribed manipulative procedure of the vehicle occupant.

4. A locking device as claimed in claim 2, in which said solenoid-operated valve means comprise a valve member having a first position providing communication between said elongate chamber and said source of the fluid under pressure and a second position blocking said communication and discharging the fluid from the elongate chamber, and a solenoid-operated valve actuator having a plunger which is engageable with said valve member for moving the valve member into said first position thereof when said switching circuit is responsive to a condition in which said prescribed manipulative procedure of the vehicle occupant is incomplete or moving said valve member from the first position to the second position when the switching circuit is responsive to the completion of the prescribed manipulative procedure of the vehicle occupant.

5. A locking device as claimed in claim 1, in which hydraulic fluid line has a first restriction located between said elongate chamber and said source of the fluid under pressure and a second restriction located downstream of said first restriction and upstream of said drain port, said second restriction being larger in cross sectional area than said first restriction.

6. A locking device as claimed in claim 5, in which said resilient biasing means comprise a preload spring which is positioned in said elongate chamber and which is seated at one end on said catch member and at the other end on a stationary member located outside and in proximity to the elongate chamber.

7. A locking device as claimed in claim 1, in which said catch member has a spherical configuration.

8. A locking device as claimed in claim 1, in which said resilient biasing means comprise a preload spring which is positioned in said elongate chamber and which is seated at one end on said catch member and at the other end on said plunger.

9. A locking device as claimed in claim 1, in which said cam is movable with a shift lever of said shift mechanism.

10. A locking device as claimed in claim 9, in which said cam is integral with said shift lever.

11. A locking device as claimed in claim 1, in which said cam is formed on a manual selector valve of the shift mechanism.

12. A locking device as claimed in claim 1, in which said cam is formed on a member interconnecting a shift lever and a manual selector valve of the shift mechanism.

13. A locking device as claimed in claim 1, in which said actuating means comprise means operative to disable said driving means from driving said catch member into locking engagement with said cam responsive to cruising condition of the vehicle.

14. A locking device for locking a shift mechanism of a power transmission system of an automotive vehicle responsive to predetermined manipulative procedure of a vehicle occupant, comprising a cam movable with the shift mechanism and formed with recesses including those corresponding respectively to the neutral and parking positions of the shift mechanism, a catch member in sliding engagement with said cam, resilient biasing means for urging the catch member against the cam, driving means having an operative condition to drive said catch member into locking engagement with said cam through one of the recesses corresponding to the neutral or parking position of the shift mechanism for thereby locking the shift mechanism in the neutral or parking position, said driving means comprising a solenoid-operated plunger having a first position retracted from said catch member and a second position in pressing engagement with the catch member for driving the catch member into the locking engagement with said cam through one of said recesses corresponding to the neutral and parking positions of the shift mechanism, said solenoid-operated plunger being moved by said driving means to the first position thereof responsive to the completion of said prescribed manipulative procedure of the vehicle occupant during neutral or parking of the transmission system or to the second position responsive to a condition in which said prescribed manipulative procedure of the vehicle occupant is incomplete during the neutral or parking condition of the transmission system, and actuating means responsive to completion of said prescribed manipulative procedure of the vehicle occupant for actuating said driving means into said operative condition when the shift mechanism is in either the neutral position or the parking position.

15. A locking device as claimed in claim 14, in which said actuating means comprise an electrical switching circuit connected between said solenoid-operated plunger and a power source and responsive to the completion of the prescribed manipulative procedure of the vehicle occupant under the neutral or parking condition of the transmission system for maintaining the solenoid-operated plunger from the first position thereof if the prescribed manipulative procedure procedure is incomplete or actuating the solenoid-operated plunger from the first position to the second position thereof if the prescribed manipulative procedure is complete during the neutral or parking condition of the transmission system.

* * * * *